V. J. JANDASEK
INVENTOR

United States Patent Office 3,068,974
Patented Dec. 18, 1962

3,068,974
TRANSMISSION CONTROL
Vladimir J. Jandasek, Dearborn, Mich., assignor to Ford Motor Company, Dearborn, Mich., a corporation of Delaware
Continuation of application Ser. No. 352,144, Apr. 30, 1953. This application Sept. 20, 1957, Ser. No. 685,137
8 Claims. (Cl. 192—3.2)

This invention relates generally to transmission for motor vehicles, and particularly to speed responsive controls for motor vehicle transmissions. This application forms a continuation of my co-pending application Serial No. 352,144, filed April 30, 1953, which is now abandoned.

In motor vehicle transmissions of the automatic or semi-automatic type certain components are controlled in accordance with the vehicle speed. Often a speed responsive mechanism such as a governor is utilized to effect the engagement of a clutch which is adapted to control certain components of the transmission. Also, valve components of a control circuit for an automatic transmission are actuated by means of a speed responsive pressure signal produced by such a mechanism. It is an object of the present invention to provide a speed responsive control for such purposes which is more economical to manufacture and assemble than a conventional governor control, yet which provides a reliable pressure signal responsive to vehicle speed.

In one embodiment of the invention the output of a power driven fluid pump associated with the transmission is discharged through a venturi to provide fluid pressure variations that are determined by the speed of the pump driving member. The resulting pressure variations between spaced zones of the venturi are utilized to operate a valve controlling the flow of fluid from the pump to a hydraulically actuated control mechanism of the transmission. For example, a hydraulically actuated lockup clutch for the transmission torque converter can be engaged at a predetermined vehicle speed by means of a valve controlling the flow of fluid from the pump to the clutch, the valve in turn being controlled by the pressure differential existing between the throat of the venturi and a zone spaced either upstream or downstream from the venturi throat. Since the pressure differential across the venturi is proportional to the square to the fluid velocity through the venturi and this fluid velocity is dependend upon pump speed, the pressure differential is proportional to the square of the speed of the pump driving member. A diaphragm may be used if desired in conjunction with the valve to increase the effectiveness of the relatively low control pressures available from the venturi. A further feature of the invention is the provision of means for overriding the differentialy controlled valve by fully depressing the accelerator pedal to release the lockup clutch and return the converter to the power train at the will of the driver.

Other objects and advantages of this invention will be made more apparent as this description proceeds, particularly when considered in connection with the accompanying drawings, wherein.

Figure 1:
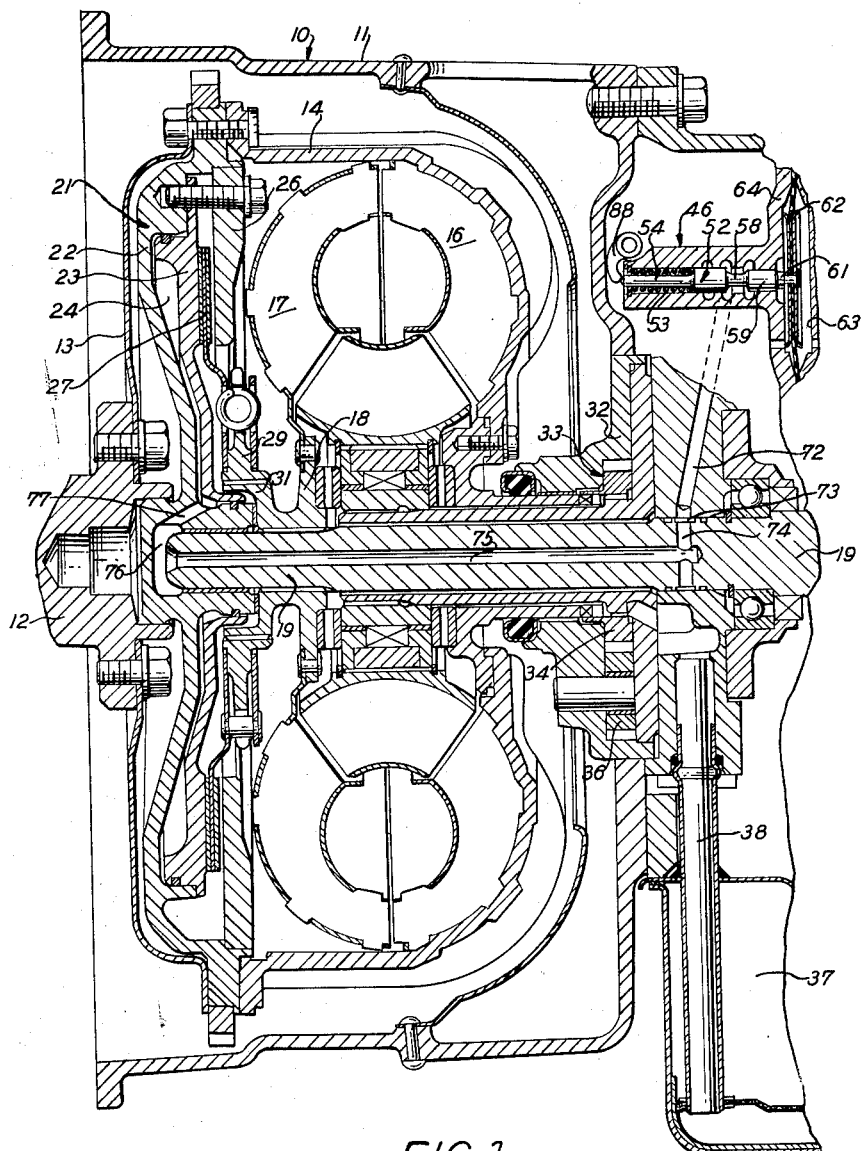
FIGURE 1 is a fragmentary cross sectional view of a motor vehicle transmission incorporating the present invention.

Referring now to the drawings, and particularly to FIGURE 1, the reference character 10 indicates generally a transmission for a motor vehicle having a case 11. The input shaft 12 of the transmission has secured thereto a driving flange 13 which in turn is bolted at its outer periphery to the shroud 14 of the impeller 16 of a torque converter. The turbine 17 of the converter is supported upon a hub 18 splined to the turbine shaft 19. The shaft 19 transmits power to the transmission gearing (not shown).

The reference character 21 indicates a hydraulically actuated lockup clutch arranged when actuated to lock the impeller and turbine of the torque converter together and to transmit power directly from the input shaft 12 of the transmission to the turbine shaft 19. The clutch housing 22 is bolted at its outer periphery to the driving flange 13 and the impeller shroud 14 so as to be rotated therewith as a unit. The clutch housing 22 supports a slidable clutch plate 23 for axial sliding movement relative thereto under the actuation of fluid pressure introduced within the chamber 24 between the clutch housing 22 and the clutch plate 23. A pressure plate 26 is bolted to the clutch housing 22 so as to be carried thereby, and is spaced from the clutch plate 23 to provide clearance therebetween for a clutch disc assembly 27 carrying friction clutch linings on the opposite faces thereof. The clutch disc 27 is supported upon a hub 29 which in turn is splined to the axially extending flange 31 of the hub 18 of the turbine 17.

It will be apparent that the introduction of fluid under pressure into the chamber 24 of the clutch 21 forces the slidable clutch plate 23 axially and clamps the clutch disc assembly 27 between the clutch plate and the pressure plate 26. This engagement of the clutch results in the transmission of power from the transmission input shaft 12 directly to the turbine or output shaft 19 so that the torque converter is locked out of the power train. Operation of the lockup clutch is effected automatically when the vehicle speed attains a certain predetermined value, as will be described more in detail hereinafter.

The housing 11 of the transmission 10 supports a pump housing 32 of a gear type fluid pump 33. The driven gear 34 of the pump is conventiently driven from the shaft 12 and meshes with a mating gear 36. The pump 33 receives fluid from the transmission sump 37 through an intake conduit 38.

Figure 2:
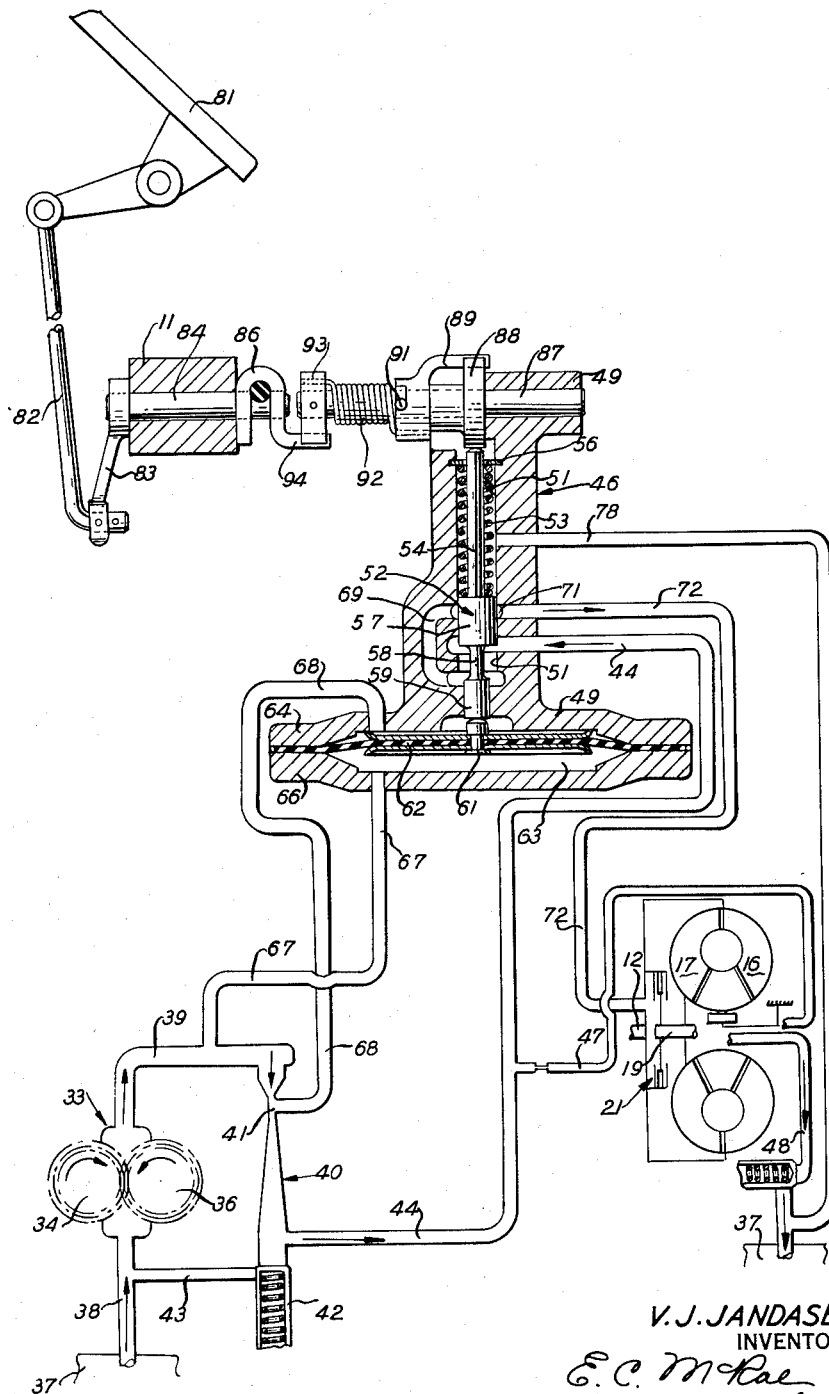
FIGURE 2 is a diagrammatic view of the construction, and showing the hydraulic circuit.

With reference now to the diagrammatic view of FIGURE 2, it will be seen that the pump 33 discharges into an output conduit 39 leading to a venturi 40 having a throat portion 41 forming a restriction serving to increase the velocity of the fluid and at the same time decrease the pressure. A regulator valve 42 is located at the output of the venturi and it controls a bypass conduit 43 communicating with the pump intake conduit 38. Also leading from the output side of the venturi 40 is a pressure conduit 44 communicating with the control valve 46. Conduit 47 is connected to the pressure conduit 44 to supply fluid pressure to the interior of the torque converter and the conduit 48 leads from the torque converter to the transmission sump 37.

The valve 46 is mounted within a valve housing 49 supported within the transmission housing 11 and is formed with a bore 51 for receiving a stepped valve plunger 52. A valve spring 53 surrounds the valve stem 54 and is held between the retainer 56 and the enlarged portion 57 of the valve. Beyond the portion 57 the valve is formed with a reduced neck portion 58 and with an enlarged guide 59 arranged to be engaged by a stud 61 carried by a diaphragm 62 contained within the enlarged end chamber 63 of the valve housing. The outer periphery of the diaphragm 62 is clamped between the enlarged flange 64 of the housing and the end plate 66 thereof.

A pair of conduits 67 and 68 communicate with chamber 63 of the valve on opposite sides of the diaphragm 62. Conduit 67 also communicates with the output conduit 39 of the pump in a zone located on the upstream side of the venturi 40, while the conduit 68 communicates with the throat portion 41 of the venturi. As a result of these spaced connections, a pressure differential exists between the conduits 67 and 68 due to the velocity of the fluid flowing through the venturi. As the speed of the pump 33 is increased the output of the pump likewise increases and the fluid velocity through the venturi is increased, resulting in an increase in the pressure differential between the conduits 67 and 68. This increase is proportional to the square of the fluid velocity through the venturi, or in other words, the square of the pump or input speed of the transmission.

The conduit 67 is a high pressure conduit due to the low velocity on the upstream side of the venturi while the conduit 68 is a low pressure conduit due to the high velocity through the throat of the venturi. Since the high pressure conduit 67 is connected to the valve housing on the side of the diaphragm 62 opposite the valve 52, the differential pressure tends to move the valve 52 against the action of the valve spring 53. When the differential pressure has reached a predetermined value it overcomes the force of valve spring 53 and moves the valve 52 to the position shown in FIGURE 2.

In the position of the valve as shown in FIGURE 2, fluid pressure in the pressure conduit 44 is admitted to the bore 51 of the valve housing adjacent the reduced neck portion 58 of the valve. The end of the bore 51 adjacent the diaphragm is connected by means of a passageway 69 to an annular passageway 71, and the annular passageway 71 in turn communicates with the conduit 72 leading to the lockup clutch 21. Consequently, in the position of the valve as shown in FIGURE 2, fluid pressure is supplied from the pump 33 through the pressure conduit 44, valve bore 51, passageway 69, annular passageway 71 and conduit 72 to the lockup clutch 21 to engage the clutch and to lock the torque converter impeller and turbine together so that power is transmited directly from the transmission input shaft 12 to the turbine shaft 19.

With reference now to FIGURE 1, it will be seen that the conduit 72 from the valve 46 communicates by means of the annular passageway 73 and radial passageway 74 in the turbine shaft 19 to the axial passageway 75 formed therein. The axial passageway 75 communicates with the chamber 76 at the end of the shaft 19 and thence through passageway 77 to the chamber 24 of the lockup clutch 21.

Figure 3:
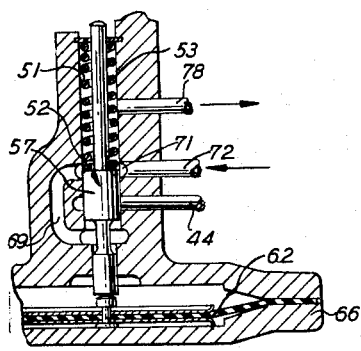
FIGURE 3 is a cross sectional view of the valve shown in FIGURE 2, but in a different position.

As long as the vehicle speed exceed a predetermined value, the lock clutch is held engaged and a direct drive is obtained, thus bypassing the torque converter. When, however, the vehicle speed decreases beneath this value, the speed of the fluid pump 33 likewise decreases and the fluid velocity discharged from the output of the pump through the venturi 41 decreases, resulting in decreasing the pressure differential between the high pressure conduit 67 and the low pressure conduit 68. Under these conditions the valve spring 52 returns the valve 53 to the position shown in FIGURE 3 in which the diaphragm 62 has been moved to a position adjacent the valve cover 66. In this position of the valve, the valve portion 57 blocks the pressure conduit 44 preventing fluid pressure from being transmitted to the conduit 72 leading to the lockup clutch. At the same time, the conduit 72 from the clutch is placed in communication through the bore 51 of the valve housing with the exhaust conduit 78 leading to the transmission sump 37. This releases the fluid pressure in the chamber 24 of the lockup clutch 21 and permits the return of the slidable clutch plate 23 away from the pressure plate 26 and the clutch disc 27 by means of conventional clutch springs (not shown). The resulting disengagement of the clutch again places the converter in the power train so that it is again effective. It will thus be apparent that the construction provides an automatic speed responsive control for a motor vehicle transmission which is relatively simple in construction.

Means are also provided for overriding the valve 46 in the event the operator desires to release the lockup clutch 21 and return the converter to the power train. Referring again to FIGURE 2, it will be seen that the vehicle accelerator 81 is connected by linkage 82 to the crank arm 83 of a shaft 84 journaled in the transmission housing 11, and carrying at its opposite end a drive lever 86. A second shaft 87 is carried by the valve housing 49 and rotatably supports a crank arm or cam 88 one end of which (as seen in FIGURE 1) abuts the end of the valve stem 54. The crank arm 88 is adapted to be engaged by an overrunning drive lever 89 to swing the crank arm in a direction to move the valve 52 from the pressure position shown in FIGURE 2 to the exhaust position shown in FIGURE 3. The drive lever 89 is connected by a lost motion connection 91 to the shaft 87, and a preloaded coil spring 92 is connected between the drive lever 89 and an arm 93 secured to the end of the shaft 87. The drive lever 86 is formed with an axially extending projection 94 arranged to engage and pick up the arm 93 after the shaft 84 has been rotated a predetermined amount under the actuation of the accelerator 81.

As a result of this construction, when the accelerator pedal 81 is fully depressed by the operator, the shaft 84 and drive lever 86 are rotated until the drive lever projection 94 picks up the arm 93 on the shaft 87 to move the latter in a direction causing the crank arm 88 to actuate the valve stem 54. The preloaded coil spring 92 enables an immediate response to be effected so that the valve 52 is rapidly moved to the position shown in FIGURE 3 in which the clutch conduit 72 is connected to the exhaust conduit 78 to disengage the lockup clutch 21 and return the torque converter to the power train.

Although the control is shown here as controlling the lockup clutch of a torque converter, it is apparent that the differential pressure control effected by the venturi at the output of the pump can be utilized to control other components of the transmission in a similar manner.

It will be understood that the invention is not to be limited to the exact construction shown and described, but that various changes and modifications may be made without departing from the spirit and scope of the invention, as defined by the appended claims.

What is claimed is:

1. In a transmission for a motor vehicle, a fluid actuated clutch, a power driven fluid pump for supplying fluid to actuate said clutch, valve structure adapted to control the flow of fluid from said pump to said clutch, a venturi receiving fluid from the output of said pump, and a pair of conduits communicating with spaced zones of said venturi to provide a pressure differential between the conduits, said conduits being arranged to apply said pressure differential to a portion of said valve structure to urge the latter in one direction with a force that is dependent upon the fluid flow through said venturi and means for yieldably opposing displacement of said valve structure in said one direction.

2. The structure defined by claim 1 which is further characterized in that said valve structure comprises a valve spool reciprocable within a valve housing and a diaphragm carried by said valve housing engageable with one end of said valve spool to reciprocate the latter, the conduits from spaced zones of said venturi communicating with opposite sides of said diaphragm to control said valve spool.

3. In a transmission for a motor vehicle, a fluid actuated clutch, a power driven fluid pump for supplying fluid to actuate said clutch, a venturi receiving fluid from the output of said pump, a valve housing, a valve within said housing, a valve spring within said valve housing engageable with said valve to move the latter in one direction, a pressure conduit transmitting fluid under pressure from said pump to said valve, a second conduit leading from said valve to said fluid actuated clutch, and a third conduit connecting said valve to exhaust, fluid pressure actuated means associated with valve to control the latter, a low pressure conduit establishing communication between the throat of said venturi and one side of said fluid pressure actuated means, and a high pressure conduit establishing communication between the opposite side of said fluid pressure actuated means and said venturi at a zone spaced a distance on one side of the venturi throat so that the pressure differential between said high and low pressure conduits is effective to actuate said fluid pressure actuated means to control said valve.

4. The structure defined by claim 3 which is further characterized in that said valve comprises a valve spool reciprocable within the bore of the valve housing, and said fluid pressure actuated means comprises a diaphragm carried by said valve housing and engageable with said valve spool to move said valve spool against the action of said valve spring when the pressure differential between said high and low pressure conduits attains a predetermined value to connect said pressure conduit with the second conduit leading from the valve to the clutch.

5. The structure defined by claim 3 which is further characterized in that a manually operated lever is engaged with the end of the valve spool opposite the fluid pressure actuated means to move the valve against the action of said means to a position connecting the second conduit from the clutch to the third conduit leading to exhaust.

6. In a transmission for a motor vehicle, an input shaft, a torque converter impeller driven by said shaft, a driven shaft axially aligned with said input shaft, a torque converter turbine connected to said driven shaft, a friction clutch between said input shaft and said driven shaft arranged when actuated to connect said shafts together to transmit power directly therebetween, fluid pressure means for actuating said clutch, a fluid pump driven by said input shaft, a venturi receiving fluid from the output of said pump, a valve housing, a valve spool reciprocable within said valve housing, a valve spring urging said valve spool in one direction, said valve housing having an enlarged chamber therein, a diaphragm in said chamber, a low pressure conduit connecting the throat of said venturi with said chamber on one side of said diaphragm, a high pressure conduit connecting a zone of said venturi spaced from the venturi throat with said diaphragm chamber on the opposite side of said diaphragm, a pressure conduit supplying fluid from said pump to said valve, a second conduit supplying fluid from said valve to said clutch, a third conduit arranged to exhaust said valve, the differential pressure between said high and low pressure conduits being sufficient when a predetermined pump speed has been attained to actuate said diaphragm to move said valve spool against the action of said valve spring to a position establishing communication between said pressure conduit and said second conduit to engage said clutch, said valve being arranged to block said pressure conduit and to connect said clutch to exhaust to disengage the clutch when the pressure differential between the high and low pressure conduits has decreased a predetermined value due to a predetermined decrease in the speed of said pump.

7. In a control circuit for an automatic, multiple speed power transmission mechanism, a fluid pressure sensitive valve means including a movable valve element, a power driven fluid pump, a pump discharge passage communicating with the delivery side of said pump, a venturi section forming a part of said passage, conduit structure including a first portion extending from the throat of said venturi section to one region of said valve means and adapted to exert a static pressure force on said valve element in one direction, a second portion of said conduit structure communicating with a zone of said venturi section spaced from the throat thereof and extending to another region of said valve means to exert a total pressure force on said valve element in an opposite direction, and spring means for balancing the net fluid pressure force acting on said valve element.

8. In a control circuit for an automatic power transmission mechanism adapted to deliver driving torque from a driving member to a driven member, a speed responsive fluid pump drivably connected to one of said members, conduit structure interconnecting said pump with other portions of said circuit, said conduit structure including a venturi section, valve means including opposed working areas and dual passage means for directing fluid pressure from the throat of said venturi section and from another portion of said venturi section to each of said opposed working areas respectively, said valve means being urged in one direction by the pressure force of the pressure differential acting on said working areas, and means for yieldably opposing said pressure force.

References Cited in the file of this patent

UNITED STATES PATENTS

| 2,517,025 | Price | Aug. 1, 1950 |
| 2,860,747 | Kelley | Nov. 18, 1958 |

FOREIGN PATENTS

| 727,144 | Great Britain | Mar. 30, 1955 |
| 933,973 | Germany | Oct. 6, 1955 |
| 758,835 | Great Britain | Oct. 10, 1956 |